United States Patent
Grassia et al.

(10) Patent No.: US 11,740,135 B2
(45) Date of Patent: Aug. 29, 2023

(54) SENSOR ASSEMBLY

(71) Applicant: BREVILLE PTY LIMITED, Alexandria (AU)

(72) Inventors: Robert Grassia, Summer Hill (AU); Chiu Keung Kenneth Lee, St Leonards (AU)

(73) Assignee: BREVILLE PTY LIMITED, Alexandria (AU)

( * ) Notice: Subject to any disclaimer, the term of this patent is extended or adjusted under 35 U.S.C. 154(b) by 779 days.

(21) Appl. No.: 16/615,787

(22) PCT Filed: May 22, 2018

(86) PCT No.: PCT/AU2018/000076
§ 371 (c)(1),
(2) Date: Nov. 21, 2019

(87) PCT Pub. No.: WO2018/213866
PCT Pub. Date: Nov. 29, 2018

(65) Prior Publication Data
US 2020/0141811 A1     May 7, 2020

(30) Foreign Application Priority Data

May 22, 2017 (AU) .................................. 2017901931

(51) Int. Cl.
*G01K 1/14*     (2021.01)
*A47J 31/44*     (2006.01)
*H01H 35/02*     (2006.01)

(52) U.S. Cl.
CPC .......... *G01K 1/146* (2013.01); *A47J 31/4489* (2013.01); *A47J 31/4496* (2013.01); *H01H 35/025* (2013.01); *G01K 2207/02* (2013.01)

(58) Field of Classification Search
CPC ................ A47J 31/4403; A47J 31/4489; A47J 31/4496; H01H 35/025; H01H 35/02; G01K 1/146; G01K 2207/02; G01K 2207/00
(Continued)

(56) References Cited

FOREIGN PATENT DOCUMENTS

| CN | 106576401 A | 4/2017 | |
| EP | 2036471 A1 * | 3/2009 | .......... A47J 31/4489 |

(Continued)

OTHER PUBLICATIONS

International Search Report and Written Opinion for PCT/AU2018/000076, dated Jul. 31, 2018.
(Continued)

*Primary Examiner* — Phuong T Nguyen
(74) *Attorney, Agent, or Firm* — Quarles & Brady LLP

(57) ABSTRACT

A sensor assembly for determining a temperature and an orientation of a jug having a bottom surface to rest on the assembly, the sensor assembly comprising: a temperature sensor for producing a temperature signal indicative of the temperature of the bottom surface, the temperature sensor being urged to move in a first direction; a diaphragm, the diaphragm being sealingly engageable with the temperature sensor and a platform supporting the jug, such that the temperature sensor extends through the platform to engage the bottom surface; a retainer, the retainer being connected to the temperature sensor and limiting movement of the temperature sensor in the first direction; and a signal generator for producing a signal when the temperature sensor is moved against the urge to move in the first direction.

23 Claims, 11 Drawing Sheets

(58) Field of Classification Search
USPC .................................. 99/280, 287, 295, 297
See application file for complete search history.

(56) References Cited

FOREIGN PATENT DOCUMENTS

| WO | WO-2015/042652 A1 | 4/2015 |
| WO | WO-2015/196240 A1 | 12/2015 |
| WO | WO-2016/070220 A1 | 5/2016 |
| WO | WO-2016/154662 A1 | 10/2016 |

OTHER PUBLICATIONS

Extended European Search Report for EP 18806181.6, dated Jan. 28, 2021.

* cited by examiner

SENSOR ASSEMBLY

FIELD

The technology relates to an orientation sensor adapted to work with a temperature sensor for a metallic milk steaming jug.

BACKGROUND

Espresso making machines are known to incorporate milk frothing or milk steaming wands. In one popular machine configuration, the steam wand, the group head for the portafilter and an optional grinder outlet are located above and share a common drip tray. The drip tray provides a convenient platform in the form of a permeable grating. Some machines have a sensor intended to contact the underside of a stainless steel or other metallic milk steaming jug. When the sensor makes ideal contact with the underside of the jug, the temperature measurement is a useful representation of the temperature of the milk as it is being heated by the steam wand. The sensed temperature may be used by the machine's processor to control steaming operations, including the stopping of some when a target temperature is reached.

However, if the desired face to face contact between the sensor and the jug is misaligned or incomplete, the temperature measurement made by the sensor may be misleading or useless.

It is possible to mechanically constrain a jug so that only face contact between the jug and the sensor is mechanically possible. However, in an espresso machine, particularly a domestic or compact machine this approach has two disadvantages. The first is that it requires additional space on the machine's platform to provide for the mechanical restraining features. In a compact kitchen appliance, this additional space is problematic. Second, the provision of mechanical features to restrain the jug disrupts the flatness of the platform. A flat platform is desirable because it is aesthetically pleasing and easier to clean.

In some actual use situations, the jug may be improperly aligned with the sensor and the user may not be aware of this. In some processor controlled operations, jug orientation is important. The detection of improper alignment may be accomplished with a conventional temperature sensor. For example, when no temperature signal or an inadequate temperature signal is received by the processor, the processor can take that information to indicate the absence of a jug or a misaligned jug. When an adequate temperature signal is received by the processor, the presence of the jug can be inferred. However, because the jug may be cold and because of the time it takes to make an accurate thermal measurement using a sensor, this kind of orientation or placement data is inferior because it is slow, lagging behind the actual event, being the misalignment or presence of the jug.

Further if it can be detected, a small degree of misalignment can be compensated for by the processor. Advantageously the tilt or orientation sensor can provide a signal to the processor representing the orientation of the jug independent from a temperature signal or temperature rise, and prior to the texturing cycle beginning. Simultaneously, the user can be alerted without interrupting a steaming operation.

Means are required for sensing when a milk jug is present. Means are also required to sense jug misalignment. Preferably these means are combined to save cost and facilitate assembly.

SUMMARY OF INVENTION

There is a need to provide an orientation sensor for a milk steaming jug. Orientation can be said to include presence, tilt and vertical travel.

There is a further need to provide a notification, warning or alert, with a user interface, that indicates when a milk steaming jug is misaligned with respect to a temperature sensor.

There is a yet further need to provide a coffee making machine having a group head and steam wand located above a common platform, the platform including a vessel orientation sensing assembly.

There is a yet further need to provide automated steaming methods that include compensation for temperature measurements or orientation measurements that relate to an orientation of a milk steaming jug.

There is a yet further need to provide an automated milk steaming apparatus having a steaming wand located above a temperature sensor on a platform. In some embodiments the distance between the end of the wand and the sensor is fixed and optimised for automated steaming operation in a jug that is supported by the platform. In preferred embodiments, this arrangement is adjacent to a group head of an espresso making machine.

There is a yet further need to provide an automatic actuation of the texturing cycle when a combination of automatic actuation parameters is present. The processor can optionally be programmably controlled to commence a texturing operation hands free without further user input.

It is an object of the present invention to at least substantially satisfy one or more of the above needs, or at least provide a useful alternative to the sensors described above.

In a first aspect, the present invention provides a sensor assembly for determining a temperature and an orientation of a jug having a bottom surface to rest on the assembly, the sensor assembly comprising:

a temperature sensor for producing a temperature signal indicative of the temperature of the bottom surface, the temperature sensor being urged to move in a first direction;

a diaphragm, the diaphragm being sealingly engageable with the temperature sensor and a platform supporting the jug, such that the temperature sensor extends through the platform to engage the bottom surface;

a retainer, the retainer being connected to the temperature sensor and limiting movement of the temperature sensor in the first direction; and a signal generator for producing a signal when the temperature sensor is moved against the urge to move in the first direction.

Preferably, the signal generator is a contact.
Preferably, the signal generator is a switch.
Preferably, the switch is a microswitch.
Preferably, the sensor assembly comprises:
three or more signal generators; and a processor, the processor being adapted to determine the orientation of the jug from the signals received from the signal generators.

Preferably, the orientation of the jug is one or more of:
a presence of the jug, indicated when at least one signal generator provides a signal;

a tilting of the jug, indicated when at least one signal generator provides a signal, and at least one signal generator does not provide a signal;

a direction of the tilting of the jug, determined by identifying the signal generators that are not providing a signal.

Preferably, when the processor determines a tilting of the jug, the processor transmits an instruction signal to a user interface to display a user alert, and the processor further limits an operation performed on the jug to a pre-established time limit.

Preferably, the operation is a steaming operation.

Preferably, the processor ceases imposing the pre-established time limit when the tilting of the jug is no longer indicated.

Preferably, the temperature sensor has one or more attachment slots; and the retainer has a channel having one or more detents, the one or more detents being engageable with the attachment slot.

Preferably, the retainer has a first thickness and a second thickness, the second thickness being greater than the first thickness;

the channel terminates in a rounded end; and the rounded end is located in the second thickness.

Preferably, the channel has a tapered pilot.

Preferably, the signal generator is located on a component;

the temperature sensor has a cable, the cable extending in a substantially straight line towards and through an opening in the assembly component.

Preferably, the component is a printed circuit board.

Preferably, the printed circuit board includes a quick connecting electrical coupling and/or an auxiliary processor adapted to receive the signal, and provide a processed signal to a processor.

Preferably, the sensor assembly further comprises a spring connected to the diaphragm and adapted to bear against an internal shelf below the platform, thereby providing the bias to the temperature sensor in the first direction.

Preferably, the sensor assembly is locatable in a mounting below the platform, the mounting having an opening through which the temperature extends in use; and the retainer is located below the mounting, such that movement of the temperature sensor in the first direction is constrainable by the retainer bearing against the mounting.

Preferably, a gap between the mounting and the platform is covered by a thin sheet top, forming a dis-continuous flat platform surrounding the temperature sensor assembly.

Preferably, the sensor assembly further comprises an actuator, wherein the actuator includes:

a base;

a neck; and a cap;

wherein the retainer has an opening adapted to receive the neck of the actuator, with the cap and base bearing against the retainer such that the actuator is engaged with the retainer.

Preferably, the actuator is an elastomeric fastener; and the elastomeric fastener further has a handle for pulling the elastomeric fastener through the opening of the retainer.

Preferably, the base of the actuator has one or more openings for increasing the compliance of the actuator.

Preferably, the base has an electrical contact to operate the signal generator.

In a second aspect, the present invention provides a coffee making machine including the sensor assembly of the first aspect.

BRIEF DESCRIPTION OF DRAWINGS

Preferred embodiments of the present invention will now be described, by way of examples only, with reference to the accompanying drawings.

DESCRIPTION OF EMBODIMENTS

Figure 1:
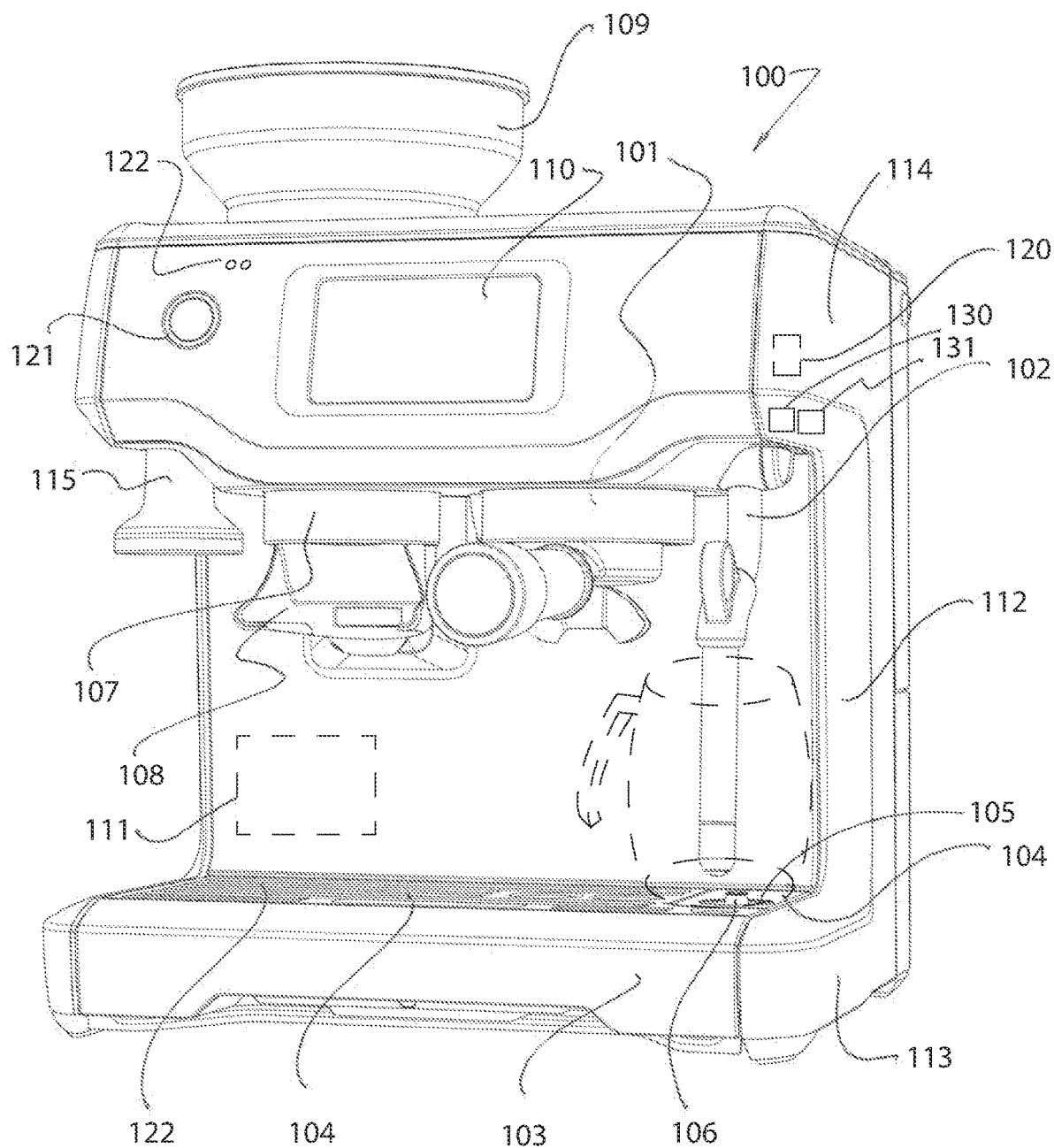
FIG. 1 is a perspective view of a coffee making machine illustrating a jug temperature sensor with tilt detection capabilities.

As shown in FIG. 1, an espresso coffee making machine appliance 100 has a group head 101 and a steam wand 102 that are located above a drip tray 103.

The drip tray 103 has a grating and its upper surface forms part of a larger flat surface or platform 104. The platform 104 comprises a usefully flat surface in which is formed an opening 105. A temperature sensor assembly 106 extends through the opening 105. In this example, the platform is subdivided such that the grating 122 may be withdrawn with the removable drip tray 103 while the sensor assembly 106 and its flat surrounding area remains stationary with the machine 100.

The machine 100 shown in FIG. 1 also includes a coffee grinder's outlet 107 and a portafilter cradle 108 that are associated with an optional internal coffee grinder having a bean hopper 109. The machine 100 has a graphic user interface 110 on a front surface, located above the group head 101.

The machine 100 includes an internal water reservoir 111 as well as boilers and water heaters as required for coffee making purposes. User preferences, process parameters and other information regarding the grinding, brewing and steaming operations may be provided on a user interface 110. The user interface 110 will allow the user to make selections that are inputs to a processor 120. Buttons (e.g. 121) and touch screens 110, 120 are known for these purposes 120.

In this example, the platform 104 extends across the entirety of the width of the removable drip tray 103. The platform 104 extends for the full depth of the drip tray 103.

However, it cannot extend the full depth of the machine 100, because of the upright body portion 112 that is required for the internal components of the machine 100.

The upright body portion 112 interconnects the base portion 113 with the head portion 114. The head portion 114 has an undersurface from which extend the steam wand 102, the group head 101 and the grinds outlet 107. In this example, the undersurface also includes an opening for receiving a removable tamper 115 that is magnetically affixed into the opening. The head portion 114 may also contain one or more switches 130, 131 that interact with the pivoting wand 102. The one or more switches 130, 131 provide information to the processor 120 regarding the position of the wand 102. For example, one switch 130 may send a signal to the processor 120 when the wand 102 is in the fully down or home orientation. The second switch 131 may provide a signal to the processor 120 when the steam wand 102 is fully extended or in the "reset" position. The wand position may be used, for example, to generate a purger cleaning sequence when the wand 102 is in the home orientation, and also as a way of indicating to the processor 120 that a new cycle may be commenced after the wand 102 has been placed into a reset position. The utilisation of the wand 102 position switch or switches 130, 131, temperature signal and jug orientation signals (as will be explained) are referred to with reference to FIGS. 16 and 17.

The machine 100 is intended to perform a number of milk steaming operations, while the milk jug is resting on the platform 104 without necessity of being held by a person.

Figure 2:
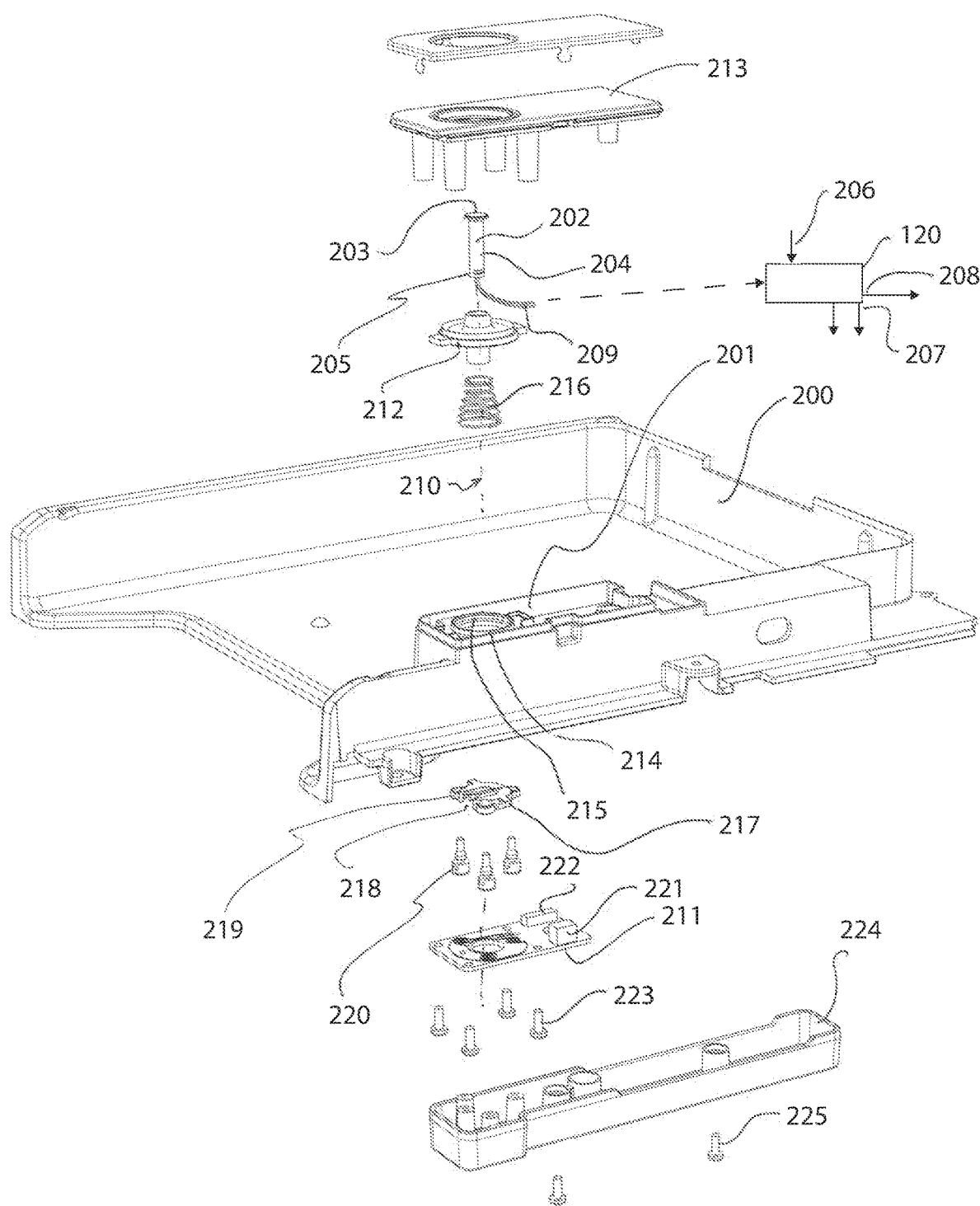
FIG. 2 is an exploded perspective view of the temperature sensor and tilt sensor depicted in FIG. 1.

As shown in FIG. 2, an internal sub-component or chassis component 200 of the machine 100 is integral with or has affixed to it a mounting 201 for a temperature sensor 202. The temperature sensor 202 has a metal body 204 with a flat upper surface 203. The body 204 is a cylinder having one or more and preferably a pair of opposed attachment slots 205. The temperature sensor 202 produces a temperature signal that is transmitted to the device's processor 120. The processor 120 receives signals from other sensors and inputs 206, 110 and transmits signals 207 for controlling processes and aspects of machine operation. The processor 120 also transmits signals 208 that are used to control the user interface 110, and features such as the on/off switch's illuminated ring 121 and special purpose indicators transducers, speakers or single LED warning lights 122.

It will be appreciated that the temperature sensor's electrical cable 209 extends through the interior of the sensor assembly 106 generally along a centre line 210, exiting the sensor area through an opening in a printed circuit board or other assembly component 211 located below the mounting 201. In this example, the component is a printed circuit board 211 that supports a tilt sensor.

In this example, the temperature sensor 202 is carried by an elastomeric diaphragm 212 or rolling diaphragm 212. The diaphragm 212 is clamped by its edges between the mounting 201 and a cap or plate 213. The mounting 201 provides a mounting opening 214 within an internal shelf 215 that receives the lower end of a tapered compression spring 216. The upper end of the compression spring 216 bears on the underside of the diaphragm 212. The spring 216 provides a force against the downward movement of the sensor 202.

As previously mentioned, the sensor body 204 has retaining slots 205 that cooperate with a retainer 217. The retainer 217 has a mouth 218 with a tapered pilot 303 for making engagement with the slots 205. The upward movement of the sensor 202 is limited by the retainer 217 when it makes contact with the underside of the mounting 201.

In the example, of FIG. 2, the retainer 217 has an array of three coupling points 219. Each coupling point 219 is adapted to bear on or optionally retain an upper end of an actuator of an electrical switch 220. Three actuators 220 carried by the retainer 217 are located above a printed circuit board 211. The printed circuit board 211 may have its own signal processors 221 as required, for receiving contact signals from each of the switches 220. The printed circuit board 211 may also provide one side of a quick connecting electrical coupling 222 to simplify the electrical attachment of the three switches 220 to the processor 120. In this example, the printed circuit board 211 is mounted to an underside of the mounting 201 with one or more fasteners 223. An underside casing component 224 is attached to an underside of the sub-chassis 200 with one or more fasteners 225 to form a compartment below the diaphragm 212.

Figure 3:
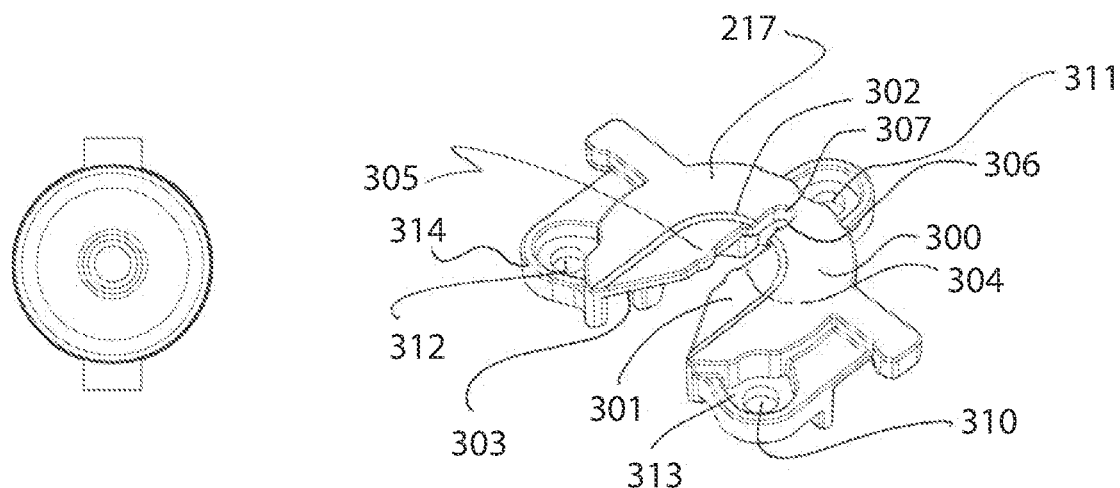
FIG. 3 is a perspective view of a retainer.

As shown in FIG. 3, the retainer 217 comprises a major upper surface 300 and below it, a minor upper surface 301 that is thinner. There may be a taper or step 302 between the surfaces 300, 301 for ease of manual assembly. The minor upper surface 301 forms a tapered pilot 303 that leads to a channel 304. In practice, the temperature sensor 202 is inserted past the pilot 303 into the channel 304. On insertion, the one or more slots 205 are engaged by one or more cooperating detents 305 that extend into the channel 304. The channel 304 terminates stress in a relief portion 306 having a rounded end 307. The relief portion 306 is formed into the thicker material associated with the major upper surface 300. It allows the retainer 217 to flex as required during assembly and disassembly.

The retainer 217 also has three neck openings 310, 311, 312. In this example, the neck openings 310, 311, 312 are formed in pockets 313, each pocket 313 having an upright rim 314.

It will be appreciated that the retainer 217 and particularly an underside of the retainer 217 may be used to activate one or more electrical switches by impinging on them vertically. Accordingly, one of the purposes of the retainer 217 is to translate the motion of the sensor 202 into a movement of the actuators 220 and cause the consequent electrical tilt indicative switching on the printed circuit board 211.

The switching that occurs is dependent on the vertical motion and tilt orientation of the retainer 217. Thus, the sensor assembly 106 can be seen as including a misalignment, orientation or tilt sensor having as its electrical output, the signal or signals produced by the actuators 220, on the switches provided by or carried by the printed circuit board 211.

Figure 4:
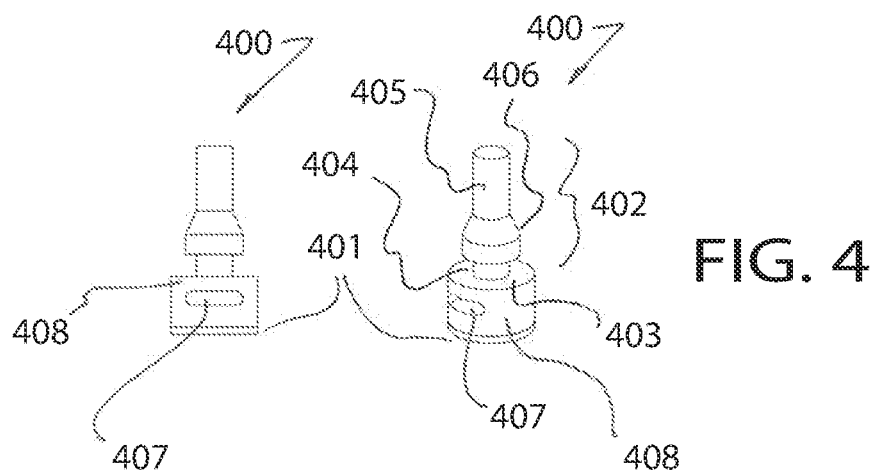
FIG. 4 illustrates side and perspective views of an actuator.
Figure 5:
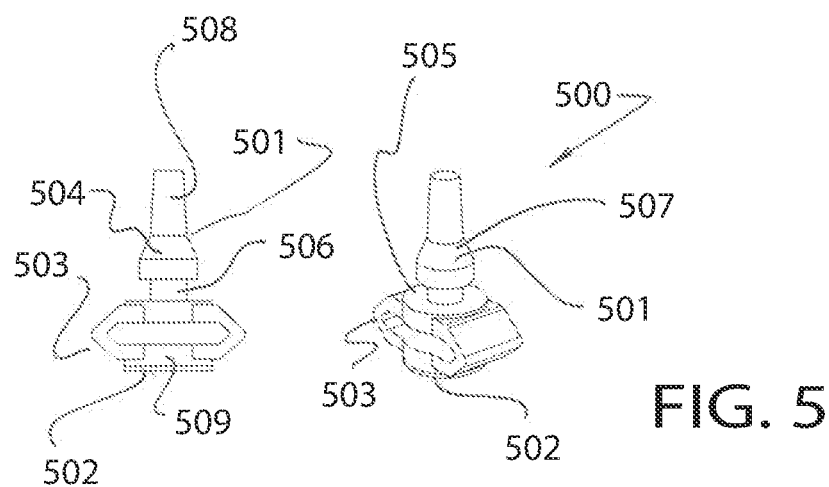
FIG. 5 illustrates side and perspective views of an actuator.

In the particular example of FIG. 3, the retainer 217 is adapted to mechanically engage, or trap, an actuator 400, 500 of the type depicted in FIGS. 4 and 5.

As shown in FIG. 4, an actuator 400 comprises a flat electrical contact 401 on its underside. An actuator 400 in these examples also includes an elastomeric fastener portion or fastener 402. The fastener 402 has a base, above which is a shoulder surface 403 that is bigger in diameter than the opening 310 and does not pass through it. The fastener 402 also has a neck 404 that fits through and is trapped in the retainer's opening 310. The fastener 402 has a nib or handle 405 for pulling the fastener 402 through the opening 310. In pulling the actuator fastener nib 405 through the opening 310, the fastener 402 stretches allowing the tapered cap 406 to pass through the opening 310. In this way, the retainer 217 is mechanically linked to the printed circuit board 211. The damping of the motion of the retainer 217 and the softness or compliance of the polymeric actuator 400 may be provided by a way of one or more openings 407 formed in or through the actuators base 408.

Figure 6:
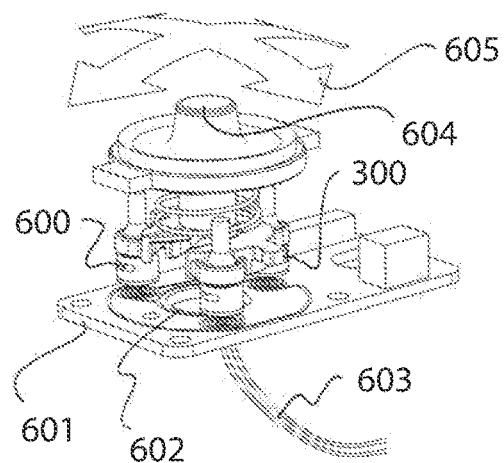
FIG. 6 is a perspective view of a temperature sensor and tilt detector.

As shown in FIG. 5, an actuator 500 has a fastener portion 501 and an electrical contact 502 on its bottom surface. In this example, the dampening and other mechanical characteristics of the actuator 500 may be controlled in the selection of material and shape of the actuator's interconnecting legs 503. Each leg 503 is "V" or "U" shaped. One end of each leg 503 is attached to an upper part 504 having the shoulder surface 505 neck 506, tapered cap 507 and nib 508. The other end of the leg 503 attaches to a separate bottom portion 509 to which the contact surface 502 is attached. As shown in FIG. 6, the three (or more) individual tilt switches 600 may be mounted in use, directly above the upper surface of a printed circuit board 601. The circuit board 601 has an optional central opening 602 through which may pass the electrical cables 603 associated with the temperature sensor 604. Movement in any direction 605 of the temperature sensor 604 is translated into a similar movement in the retainer 217. This motion causes none, some, or all of the actuators e.g. 220 to make contact with the printed circuit board 601. When all three switches 600 are actuated, the processor 120 senses and uses this information to determine that a jug is acceptably seated on the sensor 604. If no information from the switches 600 is received, the processor 120 interprets the lack of signal of an indication that there is no jug present on the temperature sensor 604. Activation of two of the switches 600 in the tilt sensor may be used to indicate tilt (and direction of tilt). When two switches in the tilt sensor are activated, the processor 120 may cause certain actions that do not interrupt a steaming operation. In this state, the processor 120 may generate a user alert and transmit it to the user interface 110, 122. This alerts the user that there is less than ideal jug orientation and provides the use with an opportunity to improve the jug's position relative to the sensor assembly 106. The processor 120 may also use this switch state to limit the current steaming operation to a pre-established time limit. This makes it less likely that the steaming is excessive, give the marginal thermal contact caused by misalignment between jug and the sensor assembly 106.

Figure 7:
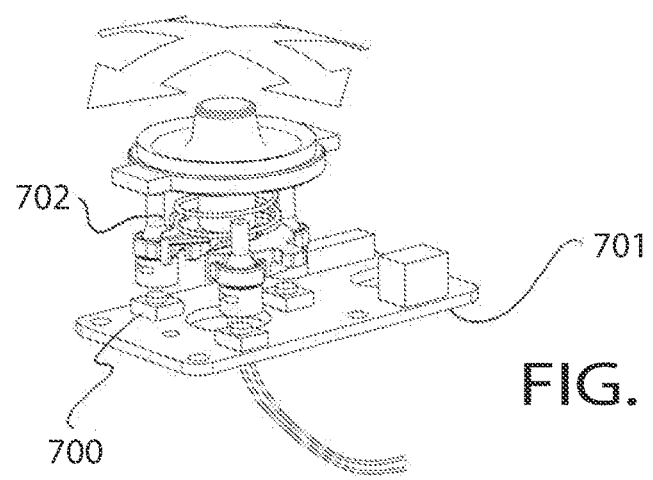
FIG. 7 is another embodiment of a temperature sensor and tilt detector for milk jug in an espresso coffee machine.

As shown in FIG. 7, complete mechanical switch mechanisms 700 may be assembled directly on to the printed circuit board 701. In this embodiment, the actuators 702 do not need to carry electrical contacts or conductors.

Figure 8:
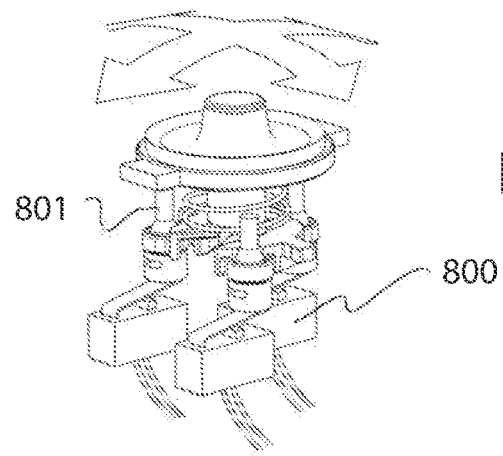
FIG. 8 is an alternate embodiment of a tilt sensor.

As shown in FIG. 8, a printed circuit board 211 is not necessary to carry the tilt switches. The processor 120 can determine tilt (including direction and degree) by detecting electrical signals from three discrete switches such as micro switches 800 located directly beneath the actuators 801.

Figure 9:
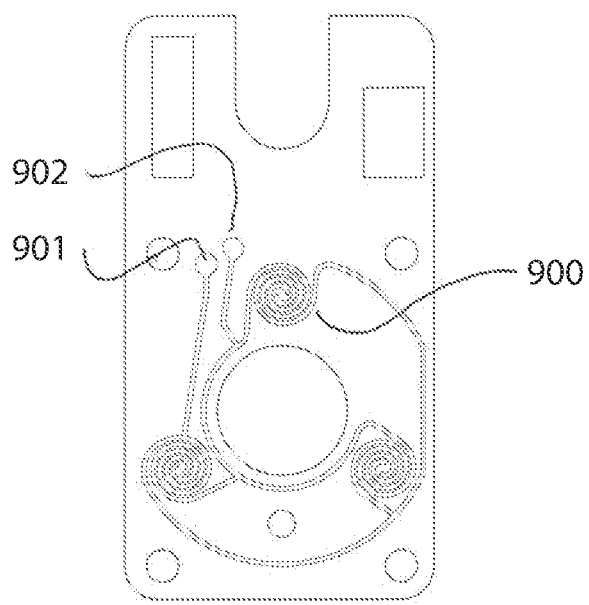
FIG. 9 is a plan view of a circuit board for a tilt sensor.
Figure 10:
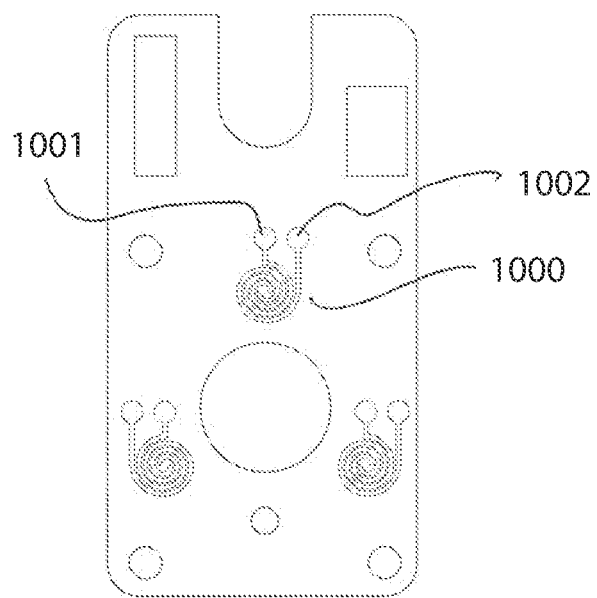
FIG. 10 is a plan view of another embodiment of a circuit board for a tilt sensor.

As shown in FIGS. 9 and 10, the various switches on the tilt sensor's printed circuit board 211 (or switch arrangement) may be provided for serial or parallel operation. In serial operation, as shown in FIG. 9, an underside of an actuator is metallic 401. It makes contact with a nested spiral circuit track 900. Contact with any one contact area 900 causes a short in the circuit located between the two primary contacts 901, 902. This arrangement does not directly provide direction or magnitude of tilt. In the parallel arrangement as suggested by FIG. 10, each nested spiral contact area 1000 has its own electrical contacts 1001, 1002.

Figure 11:
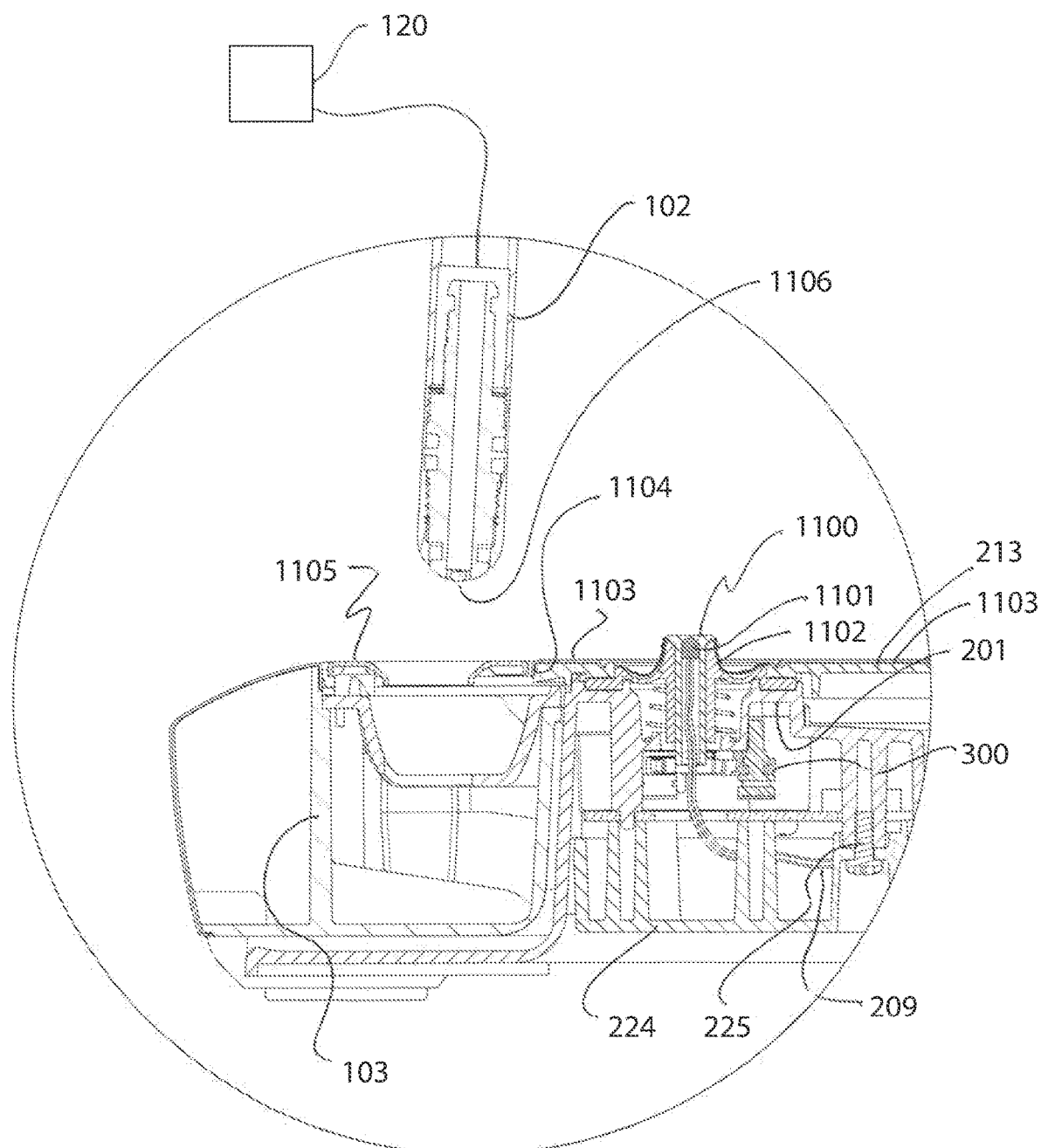
FIG. 11 is a side elevation, cut away to show the assembly of a temperature sensor with tilt sensing capabilities.

As shown in FIG. 11, the temperature sensor 1100 can be seen as having a flat upper surface below which is located a thermistor type measuring device 1101. The upper surface 1100 is bonded to and immediately surrounded by a diaphragm or rolling diaphragm 1102. The stepped edge of the diaphragm 1102 is clamped and sealed between an underside of the cap 213 and an upper surface of the mount 201. This forms a waterproof seal in the area of the temperature sensor 1100. In preferred embodiments, the cap 213 has a thin sheet metal top 1103 that is bent to cover a front edge 1104 of the cap 213 so as to compliment and form a close gap with the adjacent stainless steel grate or platform 1105 that forms the upper surface of the removable drip tray. In this way the flat surrounds of the temperature sensor 1100 and the upper surface of the drip tray 103 form a dis-continuous flat platform 104.

This is especially important in the area but where the jug is used.

FIG. 11 also suggests that in some embodiments the processor 120 recognises the pivot orientation of the wand 102 and interprets the particular orientation depicted in FIG. 11 as the 'home' orientation. In the home orientation, the wand 102 can be operated and may also be purged when returned to this orientation. This orientation is characterised as being as forward of the temperature sensor 1100 with respect to the user, slightly inclined from the vertical and with the wand nozzle 1106 located above the grate of the removable drip tray 103. In preferred embodiments, the vertical height of the nozzle 1106 with respect to the platform 1105 is pre-established in the home orientation to provide hands-off operation results when the jug is stable and in adequate contact with the temperature sensor 1100.

With reference to FIG. 11 a milk steaming operation may be performed by placing a jug with milk and the wand 102 into registration with the temperature sensor 1100 in it. In an optimal jug orientation, the jug is in face to face surface contact with the temperature sensor 1100. In this orientation, all three activators of the tilt sensor will be depressed equally and the processor 120 will interpret the resultant signals as an indication that the jug is present and in surface contact with the temperature sensor 1100. Steaming may proceed until, for example, the temperature sensor 1100 indicates that a target temperature has been reached. The processor 120 may prohibit a purge if the jug is present or misaligned with the temperature sensor 1100.

However, a user may inadvertently orient the jug so that it is either not in optimal surface contact with the temperature sensor 1100.

Figure 12:
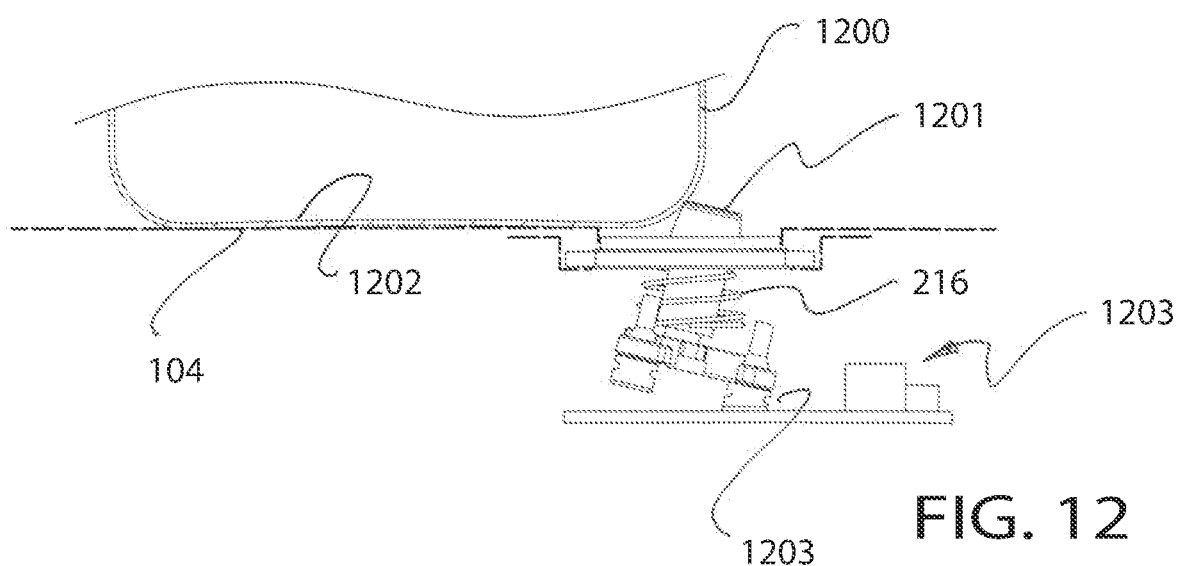
FIG. 12 is a side view, partially sectioned to illustrate the operation of a tilt sensor.

One example of inadequate contact between a jug 1200 and temperature sensor 1201 is shown in FIG. 12. As shown there, the metallic jug 1200 is in mechanical and thermal contact with the temperature sensor 1201 but it is not in surface contact. Because the edge of the temperature sensor 1201 is effectively round and the jug 1200 is radiused in the area of contact, the jug 1200 and the temperature sensor 1201 are essentially making point contact. Point contact is considered inadequate for this kind of jug temperature sensing. An activation of a single switch may have a different outcome than when two switches are activated on the tilt sensor 1203.

Figure 13:
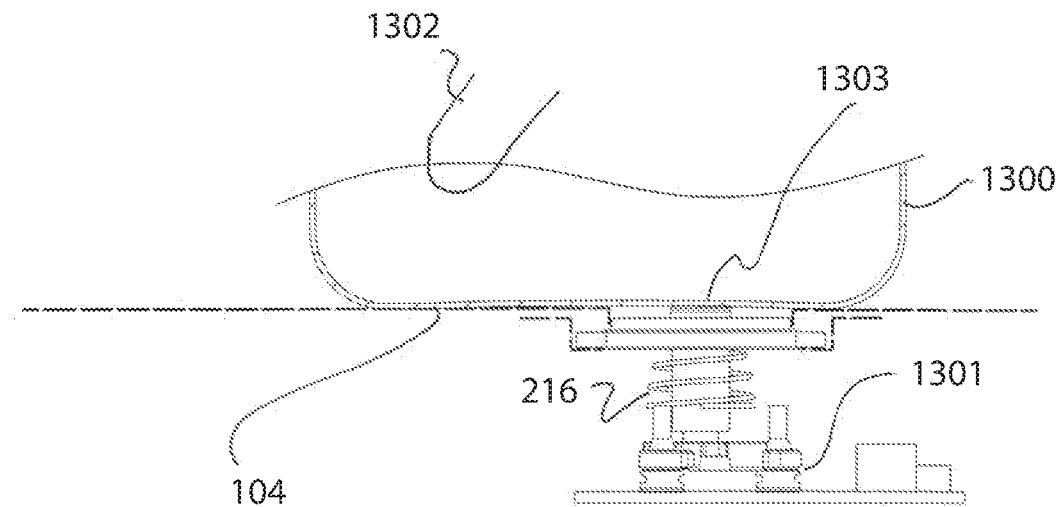
FIG. 13 is a side view, partially sectioned to illustrate the operation of a tilt sensor.

In the correct steaming orientation depicted in FIG. 13, the jug 1300 is located directly over the temperature sensor 1303 and in surface contact with it. The bottom of the jug 1300 is flat against the platform 104. All three tilt switches 1301 have been activated. The steam nozzle 1302 is submerged and within the jug 1300, ready to discharge. The compression spring 216 is able to deliver enough force to the underside of the diaphragm 212 to drive the temperature sensor 1303 into contact with the underside of the jug 1300.

Figure 14:
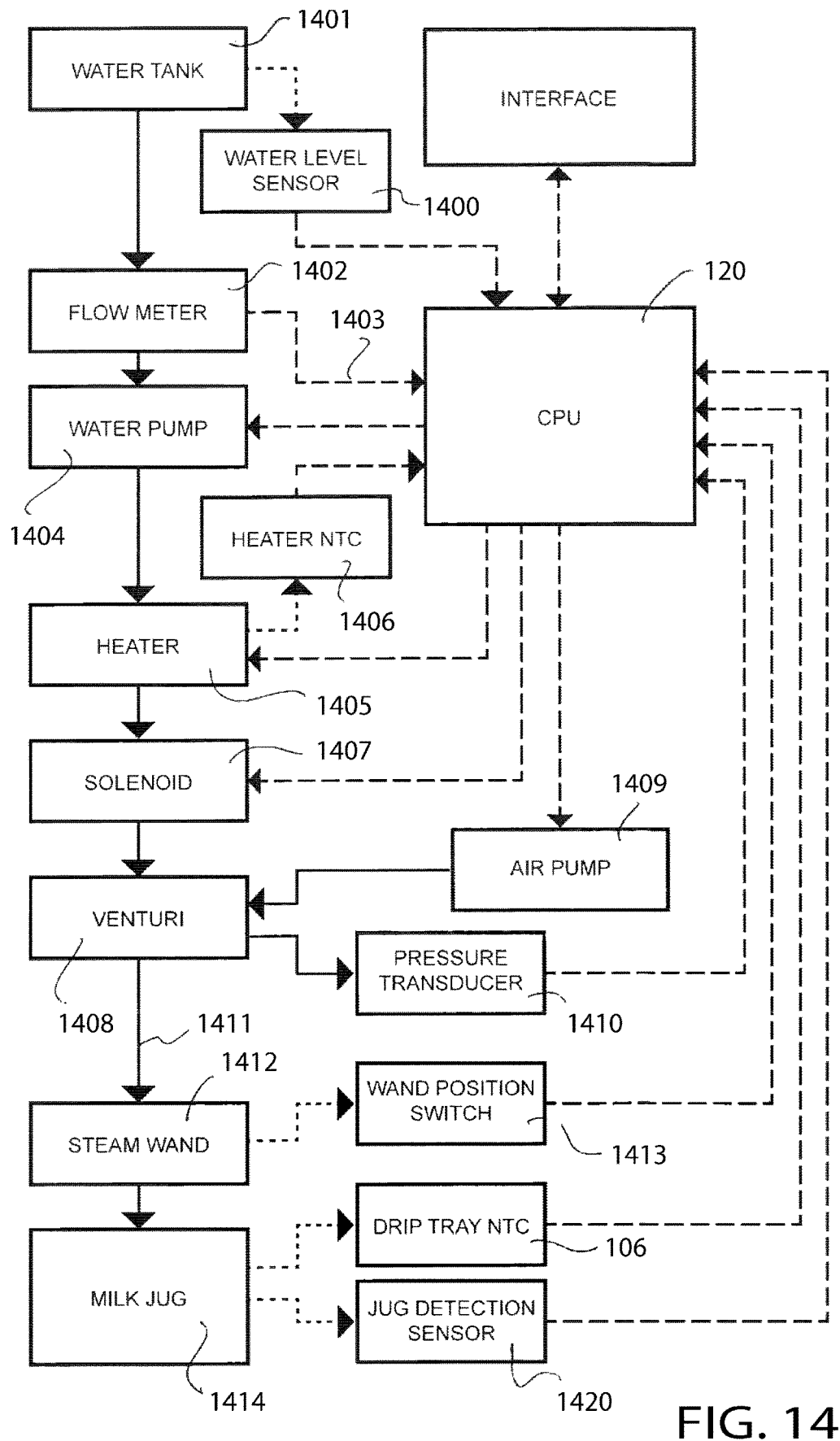
FIG. 14 is a flow chart illustrating the integration of a jug orientation sensor into an automated milk steaming environment.

As shown in FIG. 14, the processor 120 or processor of a coffee machine 100 receives information in the form of electrical signals from a number of different components. With this information the processor 120 determines the operation of the steam wand 102. In general, the processor 120 receives a level signal from water level sensor 1400 associated with the device's internal water tank 1401. The output of the water tank 1401 is detected and quantified by a flow meter 1402 that provides a flow signal 1403 to the processor 120. After the flow meter 1402, the output of the water tank 1401 is transported by a processor controlled water pump 1404. The water pump 1404 supplies a heater 1405. The temperature within the heater 1405 is measured by e.g. a heater NTC thermal sensor 1406 and communicated to the processor 120. The output of the heater 1405 is controlled by the processor 120 using a solenoid 1407. When the solenoid 1407 allows steam to pass, it flows through a venturi 1408 that both receives air from a processor controlled air pump 1409 and provides pressure information through a transducer 1410 that provides pressure signals to the processor 120. The steam/air mixture 1411 that leaves the venturi is provided to the steam wand 1412. The steam wand 1412 has a sensor associated with it 1413 that provides a steam wand or pivot orientation signal to the processor 120. The steam wand 1412 is inserted into and heats the contents of a milk jug 1414. The milk jug 1414 interacts with or contacts an external temperature sensor assembly 106 such as the one disclosed. As previously mentioned, the sensor assembly 106 and processor 120 cooperate with a tilt sensor such as the one suggested by FIG. 2, 1420. The switch or tilt signals associated with the jug tilt sensor and detection sensor 1420 are provided to the processor 120.

Figure 15:
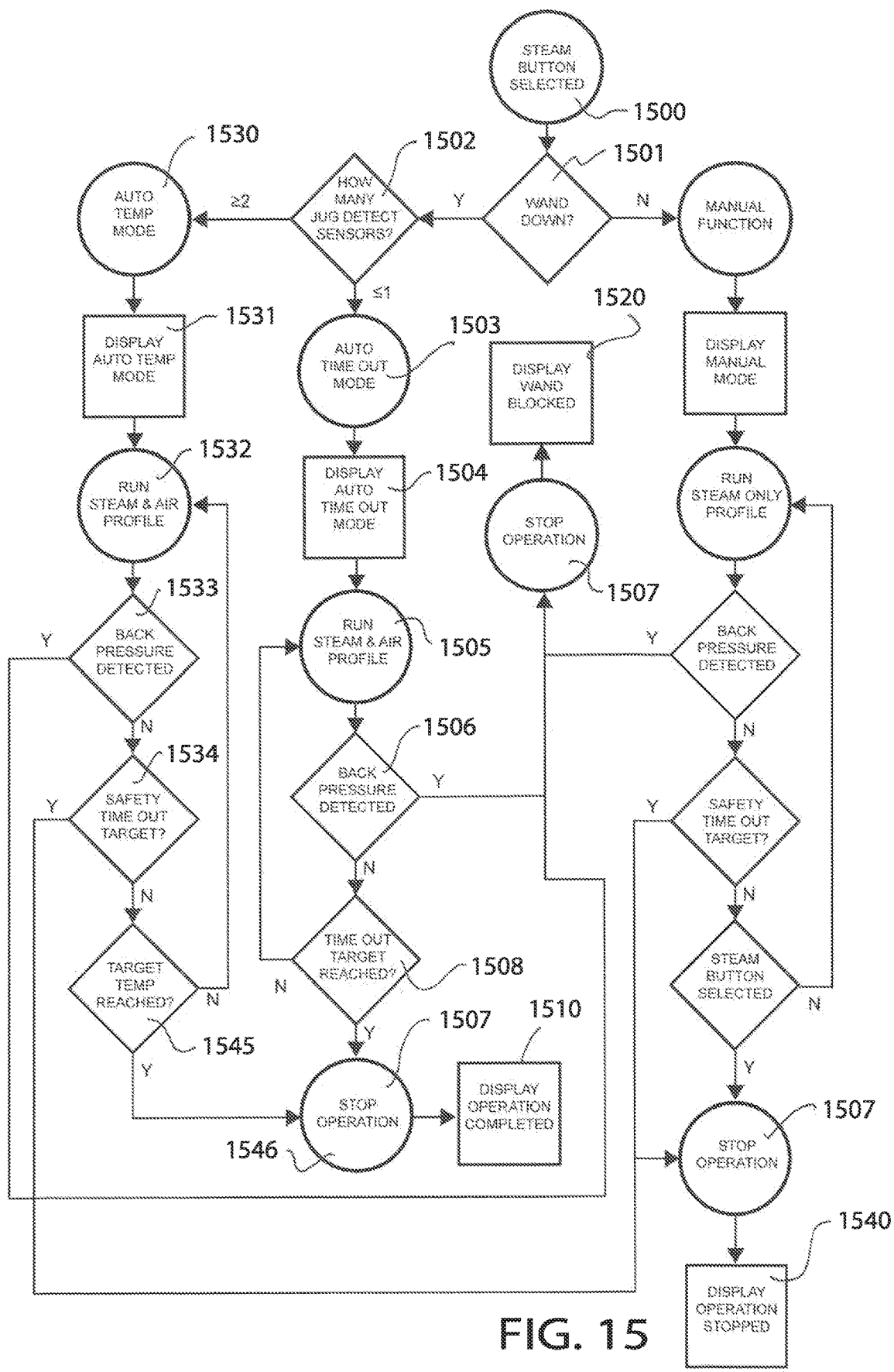
FIG. 15 is a flow chart illustrating how tilt sensor operation impacts an automated milk steaming operation.

FIG. 15 illustrates how the output of a temperature sensor with tilt or orientation detection mechanism can be used in the context of a milk steaming process. As illustrated, the degree of tilt can cause different processes to be stopped, modified or executed by the processor 120. The processes suggested by FIG. 15 are carried out by the device's processor 120 and ultimately result in milk that has either been steamed manually or in accordance with any one of a number of automated steaming functions that a user may enable. As will be shown, a tilt causes an alert to be displayed and may cause a stored time limit to cause an end of a steaming operation.

Upon detection of a user input 1500 by way of the device's user interface 110 (or otherwise) the processor 120 checks to see if the steam wand 102 is in the down or home orientation by detecting the signal provided by the wand position sensor 1501. If the wand 102 is down, the processor 120 then does a count of how many of the aforementioned tilt switches have been activated. It will be appreciated that practically any number of switches may be used in a tilt switch of the kind described here. Three switches provides a good balance between cost and performance in this environment. If the tilt sensor fails to provide an output or the output indicates that only one switch has made contact, the device enters an auto time-out mode 1503 whereupon a first type of countdown determines the duration of the steaming operation. This countdown is to prevent overheating and may be based on factors such as temperature and time remaining. The processor 120 also causes the user interface 110 to display an alert, notice or warning 1504. During this display, the machine 100 runs a stored profile 1505 that determines the characteristics of the steam and air provided to the wand 102. If back pressure or blockages are detected 1506 the operation of the steaming device is stopped 1507. If back pressure is detected and the operation is stopped, the processor 120 causes the interface 110 to provide a display or other alert 1520 that indicates that the wand 102 is blocked. If no back pressure is detected, the operation continues until the first time-out target is reached 1508. This causes the steaming operation to cease 1507. When the steaming operation stops, the processor 120 causes an interface display that indicates that the steaming operation has been completed 1510.

If two or more tilt switches have been activated, the processor 120 causes the machine 100 to enter an auto temperature mode 1530. The processor 120 causes the display to indicate that the auto temperature mode has been entered 1531. In this mode there is no time limit other than a general safety time out. In this mode 1532, a steam and air profile 1532 is run by the processor 120. The processor 120 selects steam and air parameters consistent with the profile. If back pressure is detected 1533, the steaming operation is stopped 1507 and a blocked wand display is provided by the interface to the user 1520. If there has been no back pressure detected but the safety time-out limit has been reached 1534 then the steaming operation is stopped 1507 and the user interface's 110 display is adjusted accordingly to indicate that the operation has been stopped or that a safety time limit has been reached. If the safety time-out target has not been reached but the target temperature has been reached 1545, then the processor 120 stops the steaming operation 1546 and the user's display is caused by the processor 120 to show that an operation has been completed 1510.

Figure 16:
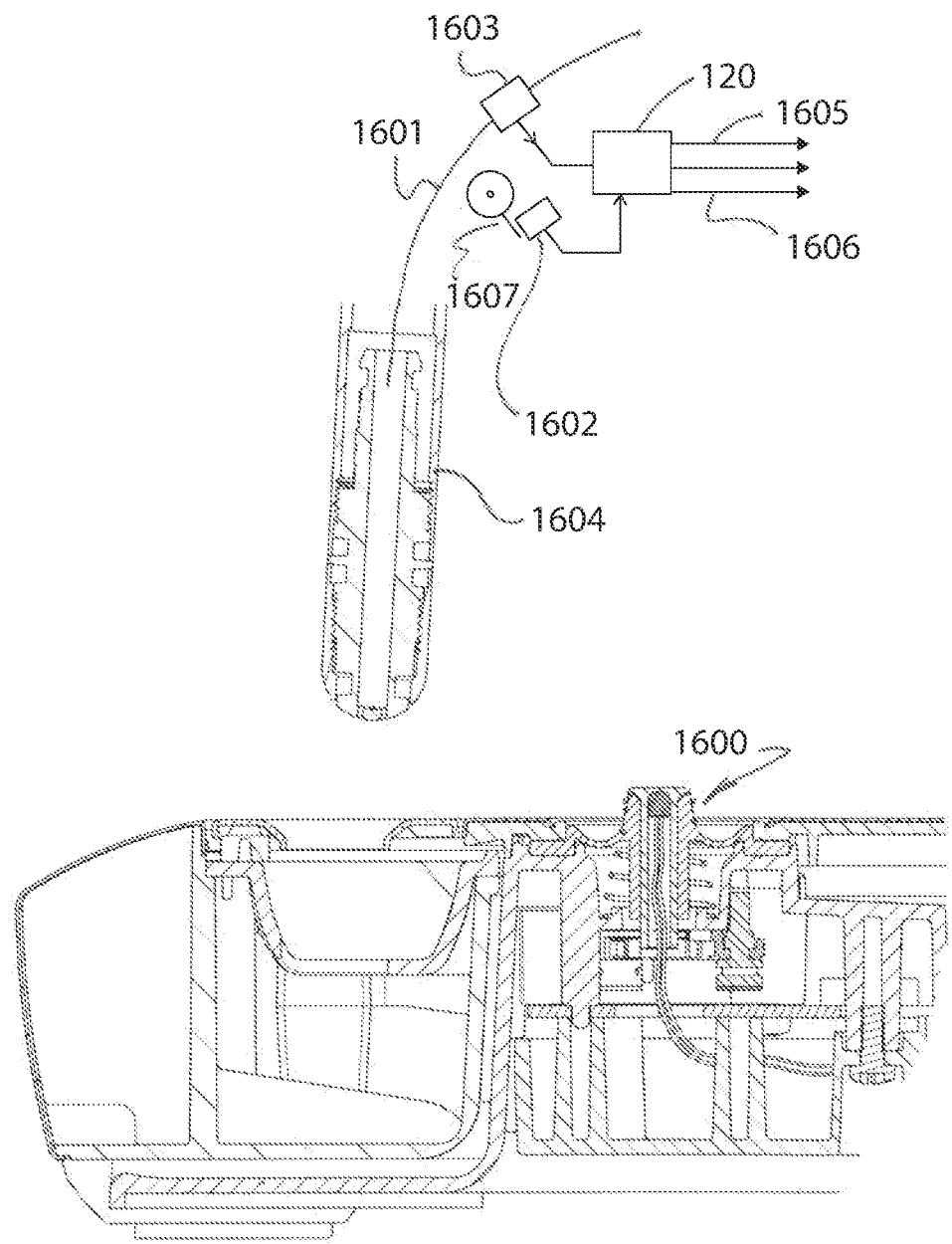
FIG. 16 is a cross sectional view of a combined temperature sensor and orientation sensor, together with a steam wand and steam back pressure sensor.
Figure 17:
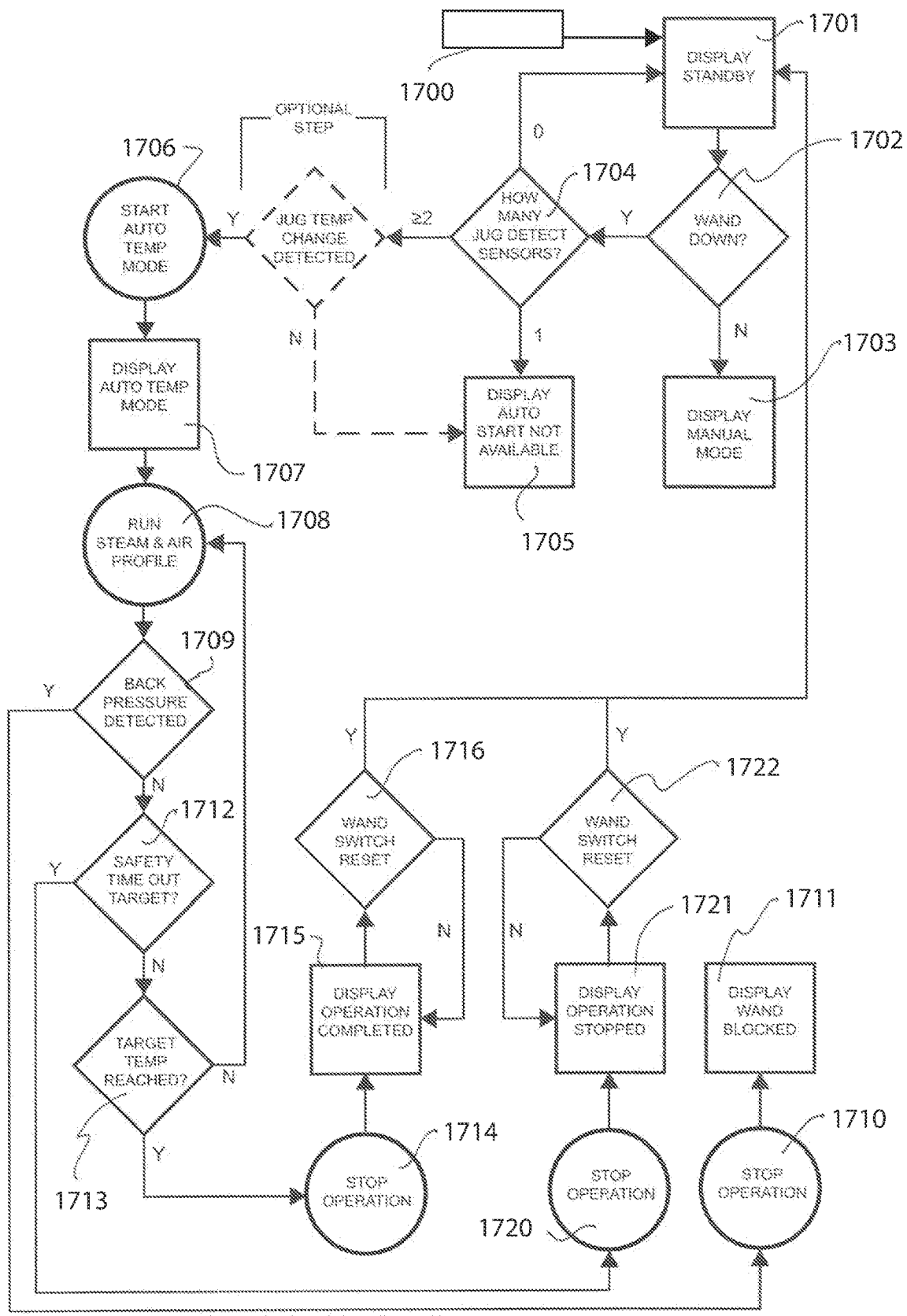
FIG. 17 is a schematic flow chart illustrating an automatic steaming sequence.

As shown in FIG. 16, the device's temperature and orientation sensor 1600 can be used to provide both temperature and orientation or tilt signals to the processor 120. An auto temperature mode is defined at one in which a steaming cycle commences after one or more physical parameters have been satisfied, but without the need for the user to manually initiate a cycle by operating the user interface once the auto temperature mode has been entered into. It will be understood that the user interface 110 may display information relating to the conception of an auto temperature mode, the disruption of an auto temperature mode as well as the parameters that may affect the initiation or cessation of an auto temperature mode. These factors include that the temperature sensed by the sensor 1600 is inappropriate for the initiation of an auto temperature mode, that the orientation of the jug is improper, that the steam wand 102 is not in the home position or that there is a blockage in the steam line 1601. As suggested by FIG. 16, the physical parameters required to initiate an auto temperature mode or routine include temperature and orientation signals from the sensor 1600, signals provided by a wand orientation switch or sensor 1602 and a pressure or pressure blockage signal provided to the processor 120 by a pressure sensor 1603 located in the steam supply line 1601 that terminates with the end of the steam wand 1604. The processor 120 may use these signals singly or in combination to send appropriate commands 1605 to the operative components of the coffee making device and separately, signals 1606 that relate to informational displays on the user interface 110. In the example of FIG. 16, a mechanical actuator 1607 makes contact with the one or more switches 1602, 130, 131 that are used to detect the steam wand position and provide the resulting information signal to the processor 120. FIG. 17 illustrates methods of initiating and maintaining an auto temperature steaming operation utilising the temperature and orientation sensor 1600 depicted in FIG. 16 or, another form of temperature or orientation sensor.

As shown in FIG. 17, an espresso making machine 100 having a steam wand 102 can be operated in an auto temperature mode. The auto temperature mode is essentially a hands free mode of steaming milk in a jug resting on the platform 104 to a desired texture and temperature. In this mode, steaming operation begins once certain physical requirements have been satisfied. The satisfaction of these requirements is detected by the one or more sensors, the sensors providing information to the processor 120 that controls the subsequent initiation, maintenance and cessation of a steaming operation. An auto temperature mode operation begins 1700 with the user selecting a steam and air profile by utilising the device's user interface 110. One simplified steam and air profile is a cappuccino style milk froth profile. This consists of, for example, steaming at 100 percent power for only three seconds, then a frothing stage wherein steam is supplied at seventy percent power while air is also introduced into the steam line (from an air pump) at one hundred percent power for thirty seconds, this followed by a mixing stage wherein steam is supplied at one hundred percent power without air until a pre-established target temperature is reached. By way of contrast, a latte style of milk froth steaming profile consists of a heat upstage in which steam is supplied at a hundred percent power for three seconds followed by a frothing stage in which steam is supplied at seventy percent power and air is supplied at a hundred percent power for (say) fifteen seconds, followed by a mixing stage wherein steam only is supplied at a hundred percent power until the target temperature is reached. A user selection of a steam and air profile places the machine into a recipe standby mode 1701. In this mode, the user interface 110 displays the selected profile and optionally a second indication that it is in a standby mode. When in the recipe standby state 1701, the processor 120 looks for a wand down signal 1702 as would be provided by the wand position switch or sensor 1602, 130, 131. If the wand 102 is not in its fully down or home position, the processor 120 reverts to a manual mode 1703 and displays an appropriate indication on the user interface 110. If the wand 102 is down, the processor 120 then senses how many of the tilt switches (e.g. 600, 700, 800) have been activated 1704. If only one switch has been activated no steaming operation is commenced and the user interface 110 displays that the auto temperature mode is not available 1705. If two or more switches have been activated the auto temperature mode is made operational 1706. Optionally, the processor 120 can make a determination as to whether or not a change in temperature (from ambient) has been detected by the temperature sensor 202. If the temperature sensor 202 working with the processor 120 do not detect a change in temperature owing to the presence of the jug, the device 100 optionally displays that the auto temperature mode is not available and a suitable display is provided on the user interface 1705.

Where the auto temperature mode has started 1706, an appropriate display is created 1707 to alert the user that the auto temperature mode is activated. Thereafter, the processor 120 calls and runs the selected steam and air profile 1708 previously requested by the user 1700. Once steam starts to flow through the steam supply line, the optional pressure sensor 1603 may provide a signal to the processor 120 to indicate that there is a blockage in the steam line 1709. If there is back pressure detected in the pressure line, the steaming operation is stopped 1710 and the processor 120 causes the user interface 110 to display an indication that the steam line is blocked 1711. If there is no deleterious back pressure, the processor 120 can optionally compare the actual run time of the auto temperature mode and compare it to a pre-established safety time out target 1712. This safety target prevents unwanted overheating of the milk. If the safety time out target has not been reached, the processor 120 determines the milk temperature utilising the readings of the temperature sensor 202. As a result of the temperature measurement and comparison 1713, the operation is either continued 1708 or stopped 1714. If the operation has been stopped as a result of the temperature target being reached, an appropriate display is created on the user interface 1715 a new steaming operation cannot be automatically initiated until the processor 120 detects that the wand 102 has been lifted into its fully extended position, this representing a reset of the steaming cycle 1716. As further shown in FIG. 17, reaching the safety time out target 1712 results in the cessation of the auto temperature mode operation 1720. This is accompanied by an appropriate display on the user interface 1721 requiring that the wand 102 be elevated into its uppermost position in order to reset and thus restart a steaming operation 1722.

Thus, the processor 120 can carry out an automatic actuation of a milk texturing cycle when the processor 120 detects a satisfactorily orientated jug optionally a second detection signal for the presence of cold milk using the temperature sensor 202, and optionally a third detection signal that the wand 102 is immersed, down or in the home or texturing position. When the combination of automatic actuation parameters is present the processor 120 may be programmably controlled to commence a texturing operation hands free without further user input. The combination may include any two or more signals comprising a jug orientation, temperature and wand 102 position. Any one of the signal types may include a preset or user programmable threshold or signal range to satisfy a processor actuated operation to automatically commence the texturing cycle. As an example, a satisfactory orientation signal may comprise a specific switch, plurality of switches, or a specific switch region or regions being contacted. The same could be said for a temperature set point or temperature range. The interface may offer further functionality where the user may be prompted to initiate or interrupt an automatic texturing operation being carried out by the processor 120 based on actuation parameters being met. This may be in the form of an audio or graphical alert depicted on the user interface 110 and instruction for the user to initiate or interrupt if the user desires.

Although the technology has been described with reference to specific examples, it will be appreciated by those skilled in the art that the technology may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present technology. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the technology, various features of the technology are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed technology requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this technology.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the technology, and form different embodiments, as would be understood by those in the art. For example, in the following claims, any of the claimed embodiments can be used in any combination.

Thus, while there has been described what are believed to be the preferred embodiments of the technology, those skilled in the art will recognize that other and further modifications may be made thereto without departing from the scope of the technology, and it is intended to claim all such changes and modifications as fall within the scope of the technology.

While the present technology has been disclosed with reference to particular details of construction, these should be understood as having been provided by way of example and not as limitations to the scope of the technology.

The invention claimed is:

1. A sensor assembly for determining a temperature and an orientation of a jug having a bottom surface to rest on the assembly, the sensor assembly comprising:
   a temperature sensor for producing a temperature signal indicative of the temperature of the bottom surface, the temperature sensor being urged to move in a first direction;
   a diaphragm, the diaphragm being sealingly engageable with the temperature sensor and a platform supporting the jug, such that the temperature sensor extends through the platform to engage the bottom surface;
   a retainer, the retainer being connected to the temperature sensor and limiting movement of the temperature sensor in the first direction; and
   a signal generator for producing a signal when the temperature sensor is moved against the urge to move in the first direction, wherein the signal generator is located adjacent the temperature sensor.

2. The sensor assembly of claim 1, wherein the signal generator is a contact.

3. The sensor assembly of claim 1, wherein the signal generator is a switch.

4. The sensor assembly of claim 3, wherein the switch is a microswitch.

5. The sensor assembly of claim 1, wherein the sensor assembly comprises:
   three or more signal generators; and
   a processor, the processor being adapted to determine the orientation of the jug from the signals received from the signal generators.

6. The sensor assembly of claim 5, wherein the orientation of the jug is one or more of:
   a presence of the jug, indicated when at least one signal generator provides a signal;
   a tilting of the jug, indicated when at least one signal generator provides a signal, and at least one signal generator does not provide a signal;
   a direction of the tilting of the jug, determined by identifying the signal generators that are not providing a signal.

7. The sensor assembly of claim 6, wherein: when the processor determines a tilting of the jug, the processor transmits an instruction signal to a user interface to display a user alert, and the processor further limits an operation performed on the jug to a preestablished time limit.

8. The sensor assembly of claim 7, wherein the operation is a steaming operation.

9. The sensor assembly of claim 7, wherein the processor ceases imposing the pre-established time limit when the tilting of the jug is no longer indicated.

10. The sensor assembly of claim 1, wherein:
    the temperature sensor has one or more attachment slots; and
    the retainer has a channel having one or more detents, the one or more detents being engageable with the attachment slot.

11. The sensor assembly of claim 10, wherein:
    the retainer has a first thickness and a second thickness, the second thickness being greater than the first thickness;
    the channel terminates in a rounded end; and
    the rounded end is located in the second thickness.

12. The sensor assembly of claim 10, wherein the channel has a tapered pilot.

13. The sensor assembly of claim 1, wherein:
    the signal generator is located on a component;
    the temperature sensor has a cable, the cable extending in a substantially straight line towards and through an opening in the assembly component.

14. The sensor assembly of claim 13, wherein the component is a printed circuit board.

15. The sensor assembly of claim 14, wherein the printed circuit board includes a quick connecting electrical coupling and/or an auxiliary processor adapted to receive the signal, and provide a processed signal to a processor.

16. The sensor assembly of claim 1, further comprising a spring connected to the diaphragm and adapted to bear against an internal shelf below the platform, thereby providing the bias to the temperature sensor in the first direction.

17. The sensor assembly of claim 1, wherein:
    the sensor assembly is locatable in a mounting below the platform, the mounting having an opening through which the temperature extends in use; and
    the retainer is located below the mounting, such that movement of the temperature sensor in the first direction is constrainable by the retainer bearing against the mounting.

18. The sensor assembly of claim 17, wherein a gap between the mounting and the platform is covered by a thin sheet top, forming a dis-continuous flat platform surrounding the temperature sensor assembly.

19. The sensor assembly of claim 1, further comprising an actuator, wherein the actuator includes:
    a base;
    a neck; and a cap; wherein
    the retainer has an opening adapted to receive the neck of the actuator, with the cap and base bearing against the retainer such that the actuator is engaged with the retainer.

20. The sensor assembly of claim 19, wherein:
the actuator is an elastomeric fastener; and
the elastomeric fastener further has a handle for pulling the elastomeric fastener through the opening of the retainer.

21. The sensor assembly of claim 19, wherein the base of the actuator has one or more openings for increasing the compliance of the actuator.

22. The sensor assembly of claim 19, wherein the base has an electrical contact to operate the signal generator.

23. A coffee making machine comprising:
a sensor assembly for determining a temperature and an orientation of a jug having a bottom surface to rest on the sensor assembly, the sensor assembly further comprising:
a temperature sensor for producing a temperature signal indicative of the temperature of the bottom surface, the temperature sensor being urged to move in a first direction;
a diaphragm, the diaphragm being sealingly engageable with the temperature sensor and a platform supporting the jug, such that the temperature sensor extends through the platform to engage the bottom surface;
a retainer, the retainer being connected to the temperature sensor and limiting movement of the temperature sensor in the first direction; and
a signal generator for producing a signal when the temperature sensor is moved against the urge to move in the first direction, wherein the signal generator is located adjacent the temperature sensor.

* * * * *